Sept. 1, 1953 J. H. FORKNER 2,650,881
PROCESS FOR THE MANUFACTURE OF A COMPOUNDED FRUIT PRODUCT
Filed Nov. 20, 1951 2 Sheets-Sheet 1
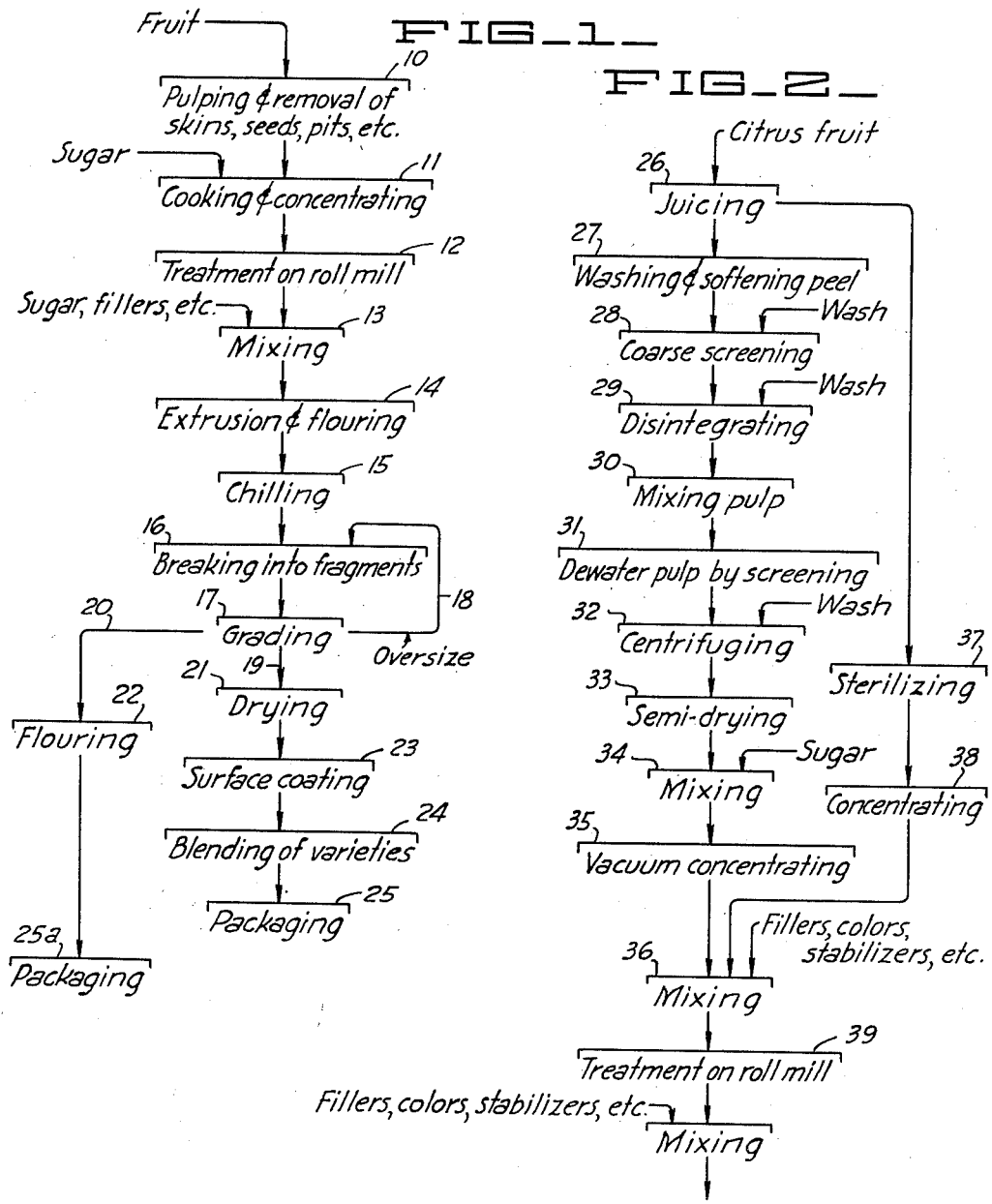
INVENTOR.
John H. Forkner
BY
ATTORNEYS Sept. 1, 1953          J. H. FORKNER          2,650,881
PROCESS FOR THE MANUFACTURE OF A COMPOUNDED FRUIT PRODUCT
Filed Nov. 20, 1951          2 Sheets-Sheet 2
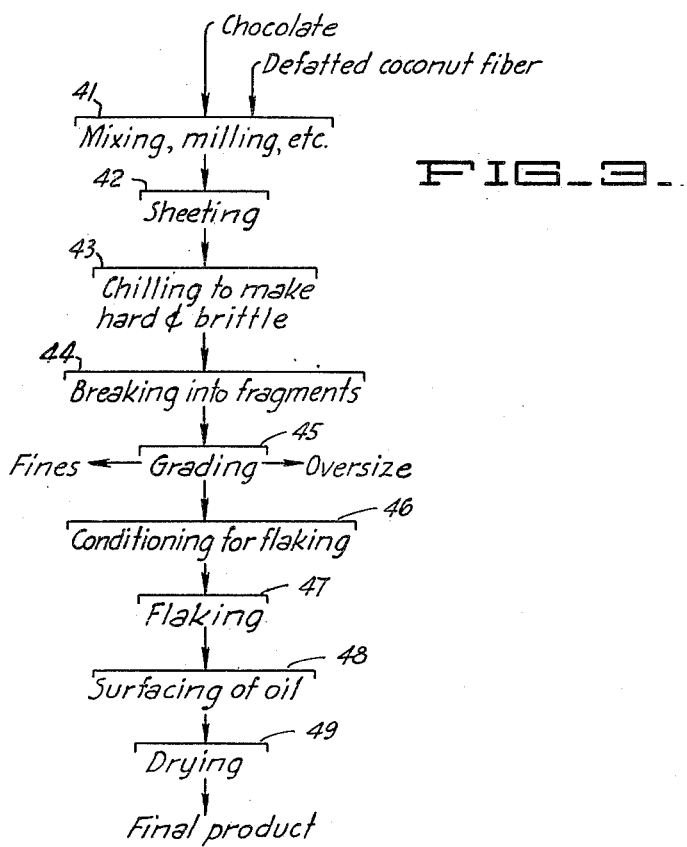
FIG_3_
INVENTOR.
John H. Forkner
BY
ATTORNEYS Patented Sept. 1, 1953

2,650,881

UNITED STATES PATENT OFFICE 2,650,881

PROCESS FOR THE MANUFACTURE OF A COMPOUNDED FRUIT PRODUCT

John H. Forkner, Fresno, Calif.

Application November 20, 1951, Serial No. 257,235

17 Claims. (Cl. 99—102)

This invention relates generally to processes for the manufacture of compounded food products, and to new products resulting from such processes.

In the past, various types of compounded food products have been manufactured from food ingredients mixed with various stabilizers and fillers. One industrial market for such products is the baking industry, where there is need for highly flavored food fragments which can be introduced into various bakery products, and which will remain stable during and after the baking operation. Generally, such products have a substantial sugar content, with a relatively low moisture content of the order of from 1 to 6%. Where fruits have been used as an ingredient in the compounding of such products, the products have had the disadvantage of lacking a brilliant color, conforming for example to the natural color of the fruit flavor employed. Also such products have been lacking in keeping qualities, palatability and flavor and have not provided the desired body and texture in the final baked bread.

In addition to the above the processes used in the past for the manufacture of such products have been unsatisfactory in many respects. Particularly such processes have been relatively expensive to carry out on a commercial scale, and they have not been adaptable to the production of fragments graded to a predetermined size to facilitate marketing for specified uses.

In general it is an object of the present invention to provide an improved process for the manufacture of stable compounded fruit products.

It is a further object of the invention to provide a process of the above character which will enable the production of compounded food products of improved characteristics, particularly with respect to flavor, color and stability.

Another object of the invention is to provide a process of the above character which will greatly facilitate commercial manufacture of compounded fruit products to predetermined size specifications.

Another object of the invention is to provide an improved process which will greatly facilitate conversion of a compounded mix having a substantial moisture content to a final product consisting of fragments having a relatively uniform size.

Another object of the invention is to provide improved products resulting from applications of the present process.

Another object of the invention is to provide an improved compounded fruit product which avoids the undesirable characteristics of prior products of this character and which in particular has improved flavor, color and stability characteristics.

Another object of the invention is to provide a new compounded fruit product in the form of hard crystal-like fragments.

Another object of the invention is to provide a new compounded food product in the form of flake-like masses.

Another object of the invention is to provide a product containing citrus peel solids, which is well adapted for a variety of uses, including incorporation in various bakery products.

Additional objects of the invention will appear from the following description in which the preferred embodiments have been set forth in detail in conjunction with the flow sheets of the accompanying drawing.

Referring to the drawing:

Figure 1 is a flow sheet illustrating one procedure for carrying out the present invention.

Figure 2 is another flow sheet illustrating a procedure for producing a citrus base, which can then be treated according to the steps illustrated in Figure 1.

In general the present process involves the production of a compounded base having a substantial sugar content, together with other food and flavoring ingredients. This mix is extruded or rolled into the form of sheets, strips, bars or like forms. Then it is chilled to a relatively low temperature to convert it to the form of a relatively hard and brittle solid. While chilled it is broken into crystal-like fragments, which are graded according to size requirements. Thereafter the material is subjected to drying to reduce its moisture content, at which the dried material can be packaged for marketing. In one embodiment of the invention the crystal-like fragments are compressed to form relatively flat flakes, which are subjected to final drying to form a final product in flaked form.

Figure 1 illustrates one procedure which can be followed to produce a produce according to the present invention from fresh fruit. Thus in operation 10 one or more fresh fruits are treated for the removal of skins, seeds or pits, and the flesh of the fruit is mechanically disintegrated to form a pulp. This pulp is then subjected to one or more cooking and concentrating operations 11, at which time some sugar is added. The resulting material should have a refractometer reading within the range of from about 60 to 85, and preferably from about 72 to 78. The material is then treated in step 12 on a roll mill, as for example a 3, 4 or 5 roll mill of the Lehman-National type. The rolls of such a mill turn at progressively increasing speed, and it is desirable that the rolls be set with their peripheries relatively close together, as for example a distance of the order of from 1/16 to 1/10 of an inch.

During treatment on the roll mill remarkable changes can be noted. Some aeration of the material takes place, there is a noticeable lightening in color, the flavor is greatly improved, and objectionable cooking or dehydrating odors and off flavors are eliminated. The material also takes on a smooth homogeneous texture. The paste produced by the milling operation 12 may contain from 15 to 40% water. Preferably the sugar content of this paste is increased by the addition of sugar in the mixing operation 13. Also at this point additional fillers and stabilizers can be added, as for example, a fruit paste and defatted coconut fiber. The coconut fiber preferably has the majority of its original oil content removed, and for example can be made by the process disclosed in my Patent No. 2,422,893.

Colors and flavors can be added prior to milling at 12, or in subsequent mixing at 13. In fact all added ingredients, such as coloring, sugar, fruit juice or flavoring, can be incorporated before milling, or some of these ingredients or parts thereof may be added after milling.

In the next operation 14 the paste-like material is extruded in the form of sheets, slabs, strips, or like extruded forms. Conventional sheeting dough rolls can be used for this purpose although I prefer that the rolls be cooled. The sheets for example may range from 1/8 to one inch in thickness. As the material is extruded it is desirable to flour the surfaces of the sheets or strips to minimize any surface stickiness.

In the next operation 15 the extruded forms are chilled to a relatively low temperature to make them hard and brittle. The apparatus employed for this operation may consist of a tunnel maintained at low temperature, and through which the extruded forms are caused to progress by suitable conveying means. The final temperature may for example range from 20 to —20° F. Also, suitable results have been secured by subjecting the extruded forms, after being permitted to cool in contact with room temperature atmosphere, to cold air at a temperature of about —20° F. for a period of about thirty minutes.

In conjunction with extrusion of the material the sheets or strips are preferably scarfed according to any desired pattern. The scarf lines may for example extend laterally and longitudinally of the sheet or strip to form small squares or rectangles, or the lines may form diamond-shaped patterns or any other regularly shaped forms. When such a scarfed sheet is broken after chilling, the bulk of the fragments will assume a size governed by the spacing and arrangement of the scarf lines, thus minimizing the formation of fines. The scarfing may range in depth from light marking to grooves extending more than half way through the sheets and can be applied by suitable embossing rolls, embossing grids, or like means.

The chilled brittle forms are broken into crystal-like fragments in a cracking operation 16, which can be carried out by any suitable hammer cracking or hammer mill. The fragments are then subjected to grading at 17 to provide masses corresponding to desired size specifications. This grading is carried out while the fragments are frozen and very hard, and before their temperature has raised to a point sufficient to cause stickiness. In the flow sheet of Figure 1 two graded and one oversize fractions are indicated. The oversize fraction 18 for example may be plus 3/8 inch mesh, and is shown being returned to the operation 16 for recracking. Fraction 19 can be plus 1/8 to 1/4 inch mesh, and the fine fraction 20 can be minus 1/8 to plus 1/16 inch mesh. The moisture content of these fragments may range from about 8 to 15%.

Following grading of the fragments, it is desirable to subject them to drying for the purpose of producing a final moisture content of the order of from 2 to 6%. Such drying, indicated at 21, can be carried out by subjecting the material to a drying gas such as warm air at a temperature of the order of 160° F. Drying temperatures of this order will not have any detrimental effect on flavor or color.

If desired, the dried fragments can be subjected to surface coating at 23, to minimize break-down during the mechanical mixing operations involved in bread making. The coating material may be a suitable wax or pectin solution.

After surface coating at 23, the material can be blended with other varieties at 24, such as various flavors, colors and the like. The material is then packaged at 25.

It will evident that the process described above (Figure 1) has many desirable characteristics. It enables manufacture of compounded fruit products to predetermined size characteristics and in relatively stable crystal-like fragments which are well adapted for use in the baking industry. There is no serious impairment of color, flavor and general palatability, but on the contrary the product has a brilliant natural color, and a flavor which can be made to conform closely to the flavor of the natural fruit. In general, the product produced by the process described is of relatively high quality compared to compounded fruit products which have been produced in the past.

Chilling or freezing the material to a low temperature preparatory to final drying, is an important feature of the invention. It makes possible cracking of the material to crystal-like fragments of a size suitable for further treatment. Such fragments while frozen can be readily graded to eliminate fines and coarser particles which are not within the required size range. The drying of such graded material can be carried out more advantageously than the drying of larger fragments, or masses such as the rolled or extruded sheets or slabs. The drying time is greatly reduced, and the graded fragments are more readily handled in ordinary drying equipment of the tray type. For example, in one instance graded fragments of the character previously described were dried to the desired moisture content over a period of about one hour, whereas the same material in the form of sheets required a drying time of about four hours. Reduction in the drying time is advantageous in that it promotes production of products which are of high quality with respect to both color and flavor. Assuming that grading is carried out to eliminate particles varying widely as to size, the drying time can be advantageously adjusted to suit the particular particle size of the material. Thus it is possible to eliminate overdrying and impairment of flavor and color of fragments whch are relatively small with respect to large fragments present which require a longer drying time.

The process described above is applicable to a wide variety of fruit salads and juices. A variety of fresh fruits can be employed with the process as illustrated in Figure 1, including for example, peaches, pears, grapes, apricots, various berries, cherries, pineapple, banana, and the like. It is also possible to utilize so-called dried or partially dehydrated fruit, such as dried dates, prunes, figs, peaches, apples and apricots. When using dried fruits the pits or seeds are generally removed, and then the material is pulped. Some sugar is added to prevent later spoilage when incorporated in bread. The amount of sugar and moisture present should be such that the final pulp is of proper consistency for treatment in the milling operation 12. In other words, the refractometer reading should be within the range of from 60 to 87, and preferably from 78 to 84. After treatment at 12 the process proceeds as described with reference to Figure 1.

I can make an excellent citrus fruit product by utilizing in my process a suitable citrus fruit paste such as one made as shown in the flow sheet of Figure 2. Thus a citrus fruit, such as oranges, lemons, grapefruit, limes, and citrons, is subjected to the juicing operation 26, after which the peel, together with fibrous membrane-like material or rag, is supplied to the operation 27, where it is subjected to washing with water and to mechanical beating or pounding operations to soften the peel. Prior to or in conjunction with such washing operations the material can be subjected to mechanical pressure in a suitable press. During this time a considerable amount of the bitter skin components are loosened and removed from the remaining solids of the peel.

The peel is then subjected to coarse screening at 28, where it is further washed with water, and where the peel is separated from seeds and like material. The softened peels are now disintegrated at 29, as by means of a suitable disintegrator of the hammer mill type or in a suitable grading appliance.

After being disintegrated at 29 a pulp is formed and the bulk of the solid material comprising the pulp ranges from 6 to 20 mesh in size. The pulp can be subjected to further mixing and agitation at 30 to loosen the bitter skin components from the remaining peel solids, and then a part of the water removed as by the screening operation 31, in which the pulp is pumped on a dewatering screen. After such dewatering the pulp can be washed and further dewatered by suitable treatment such as centrifuging at 32, with the use of additional wash water as indicated. In place of such centrifuging the pulp can be treated in a suitable filter press for further removal of water. After such centrifuging or treatment in a press, the material has most of the bitter liquid components removed from the peel fiber although some residual bitter components remain. The pulp at that time may contain from about 10 to 20% solids.

The pulp is now subjected to a concentrating or semi-drying operation 33, during which time the material is contacted with hot drying gas to produce a pulp containing about 30 to 60% solids. This operation can be carried out in a rotating drum type of drier. Sugar is now added to the pulp as indicated by mixing operation 34. Ordinary cane sugar or sugar syrup is suitable for this purpose, and a sufficient amount of sugar can be added so that the resulting mixture forms a paste of suitable consistency and concentration for milling.

The pulp is now subjected to the vacuum and cooking operation 35, in a suitable closed vessel. A vacuum corresponding to a 20 to 29 inch mercury column is maintained within the vessel, and the pulp is heated to temperatures ranging from 100 to 170° F. while continuously agitated. During this treatment some volatile constituents are removed with the vapor evolved from the pulp. It is desirable to precede such vacuum treatment with a short period of pressure cooking at temperatures of the order of from 212 to 260° F. with continuous agitation.

In the mixing operation 36 following the vacuum cooking and concentrating operation 35 it is desirable to add additional fillers, stabilizers, and the like, such as defatted coconut fiber. It is also desirable to add at this point colors and flavors which may be desired. Assuming that it is desired to have the color and flavor of the same citrus fruit being supplied to the process, then juice taken from the fruit in step 26 can be suitably treated to provide a fruit juice concentrate. Thus juice from 26 can be treated to heat sterilization at 37, after which it is subjected to vacuum evaporation to concentrate the same as indicated at 38. A part or all of this concentrate is then supplied to the mixing operation 36. In general the pulp after mixing at 36 may contain sugar in proportions ranging for example from 250 pounds of citrus solids and 2,000 pounds of sugar, as a maximum, to 250 pounds of citrus solids and 500 pounds of sugar as a minimum, with about 250 pounds of citrus solids and 1,200 pounds of sugar being a desirable proportioning.

Assuming the use of suitable proportions, including suitable amounts of sugar added to the pulp at operation 34, the material is now of proper consistency (i. e., 60 to 80 refractometer reading) for the milling operation 39, which is carried on in the same manner as the milling operation 12 of Figure 1. This serves to produce a high quality citrus fruit paste which then proceeds through the remaining steps described with respect to Figure 1, namely steps 13 to 21, inclusive, to produce dried fragments of a graded size for marketing.

It will be evident that the process described above is applicable to the manufacture of blended fruit products, as well as to products made from one fruit source. Thus two or more fruits can be supplied to the process of Figure 1, or a fruit product made according to Figure 1, from a material such as a dried fruit, can be blended with a citrus product made according to Figure 2, the two materials being homogeneously intermixed before extrusion and chilling.

Assuming that fruit juice concentrate is added to the material prior to extrusion and chilling, such as concentrate from 38 (Figure 2), its addition tends to make the material quite sticky and difficult to handle and work. However by chilling according to the present process such material can be handled without difficulty, thus facilitating manufacture of products containing substantial percentages of juice concentrates, and enabling such products to be made in the form of hard fragments which are like crystals in shaping and consistency. Thus in addition to supplying a citrus juice concentrate to citrus material as in Figure 2, citrus or other fruit juice concentrates can be added to other fruit material, such as treated dried apricots, etc.

Figure 3 illustrates another embodiment of the invention for producing a chocolate product. In this instance commercial chocolate, made from cocoa and sugar, is applied to the mixing operation 41, where it is melted and mixed with a filler such as defatted coconut cellulose fiber. After mixing the resulting material may contain about 10% moisture and 50% sugar. This material is then extruded or rolled into sheets or slabs at 42, and the sheets subjected to chilling at 43 to make the same hard and brittle. The chilling may be to a temperature of the order of 20° F., or lower. The chilled sheets are subjected to cracking or breaking at 44, in a suitable hammer mill, and the resulting fragments while chilled, are subjected to grading at 45 as by screening. Fragments of the desired size specifications are then subjected to conditioning at 46 for a subsequent flaking operation. Such conditioning can be carried out by elevating the temperature of the fragments to a value of the order of 100° F., where they are of proper consistency for pressing into flakes. The temperaure can be elevated by permitting the fragments to stand in contact with atmospheric air at room temperature, or by heating. In the subsequent flaking operation 47 the fragments are passed between rolls to compress them into flakes of the desired thickness. In a typical instance the flake produced may have a thickness of about $\frac{1}{16}$ inch. After flaking it is desirable to treat the material at 48 for surfacing of oil. This can be carried out by exposing the flakes to direct sunlight or to a suitable artificial source of radiant heat. Such treatment provides an attractive dark glossy color. Following flaking and surfacing of oil the material is subjected to a drying operation 49. Drying can be carried out in an ordinary atmospheric pressure type of tunnel drier, or vacuum drying can be employed. Vacuum drying can be carried out by placing the flakes in trays and then placing the trays upon heated shelves within a vacuum drying chamber. The shelves can be heated to a temperature of the order of from 160 to 180° F. After preliminary heating a vacuum is applied and retained over a substantial period of time until the desired moisture content has been reached. Application of a partial vacuum after preliminary heating serves to expand or puff the flakes. The final moisture content may be of the order of from 4 to 6%.

In addition to the fruit and chocolate products previously described many other products can be manufactured by use of the present process, by utilizing different flavoring or food ingredients. In addition to the fruit and chocolate products reference can be made to nut products made from the paste of nuts or kernels. Thus paste made by milling almond nut meat can be substituted in place of the chocolate in the process of Figure 3, to produce a compounded nut product.

This application is a continuation-in-part of my copending application Serial No. 101,732, filed June 28, 1949, for "Food Product and Process of Manufacture."

I claim:

1. In a process for the treatment of a homogeneous material containing fruit solids and sugar and having a substantial moisture content, the steps of chilling the material to a low temperature to render the same brittle, cracking the brittle material to form crystal-like fragments, and drying the resulting material to provide a final dried product.

2. In a process for the treatment of a homogeneous food material containing fruit solids, sugar, and in excess of about 8% moisture, the steps of forming the material into strips or sheets, chilling the strips or sheets to a low temperature below 32° F. to make the mass brittle, cracking the brittle material to form fragments, and then subjecting the material to drying to produce a final product having a moisture content of the order of from 1 to 8%.

3. A process as in claim 2 in which the cracked fragments are graded while chilled.

4. In a process for the treatment of a homogeneous material containing fruit solids, sugar, and a moisture content in excess of 8%, the steps of forming the material into strips or sheets, chilling the strips or sheets to a low temperature to make the mass hard and brittle, cracking the brittle material to form crystal-like fragments, pressing the fragments into relatively flat flakes, and then subjecting the flakes to drying to provide a final moisture content of the order of from 1 to 8%.

5. In a process for the formation of a compounded food product, the steps of pulping a food material, adding sugar to the pulp to form a material of paste-like consistency, milling the material to reduce the particle size of the solids, forming the milled material into strips or sheets, chilling the material to a low temperature to make the mass brittle, and then cracking the brittle material to form crystal-like fragments.

6. A process as in claim 5 in which the strips or sheets are scarfed prior to chilling of the same.

7. In a process for the formation of a compounded fruit product, the steps of pulping fruit solids, adding sugar to the pulp to form a material of paste-like consistency, milling the material to reduce the particle size of the solids and to lighten its color, forming the milled material into strips or sheets, chilling the material to a low temperature to make the mass brittle, and then cracking the brittle material to form crystal-like fragments.

8. A process as in claim 7 in which the strips or sheets are scarfed prior to chilling of the same.

9. In a process for the manufacture of a compounded fruit product containing citrus solids, the steps of reducing citrus peel to a pulp having the bulk of the pulp solids of a size within the range of from 6 to 20 mesh, subjecting the pulp to separating and washing operations for removing the bulk of the bitter skin components, subjecting the pulp to cooking, adding sugar to the pulp to form a material of paste-like consistency, milling the material to reduce the particle size and to disperse pockets of bitter components homogeneously throughout the mass, forming the resulting milled material into strips or sheets, chilling the strips or sheets to make the mass brittle, and then cracking the brittle material to form crystal-like fragments.

10. In a process for the manufacture of a compounded fruit product containing citrus solids, the steps of reducing citrus peel to a pulp, having the bulk of the pulp solids of a size within the range of from 6 to 20 mesh, subjecting the pulp to separating and washing operations for removing the bulk of the bitter skin components, subjecting the pulp to cooking, adding sugar to the pulp to form a material of paste-like consistency, milling the material to reduce the particle size and to disperse pockets of bitter components homogeneously throughout the mass, forming the resulting milled material into strips or sheets, chilling the strips or sheets to make the mass brittle, and then cracking the brittle material to form crystal-like fragments.

11. In a process for the manufacture of a compounded fruit product containing citrus solids, the steps of juicing citrus fruit, forming a hydrous pulp of the citrus peel, the pulp having the bulk of its solids within the range of from about 6 to 20 mesh, subjecting the pulp to separating and washing operations to remove the bulk of the bitter skin components, subjecting the pulp to cooking under partial vacuum, concentrating at least a portion of the juice removed from the citrus fruit, adding such fruit juice concentrate to the material after said cooking operation, adding sugar to the material after said cooking operation to form a material of paste-like consistency, milling the material to reduce the particle size and to disperse pockets of bitter components homogeneously throughout the mass, forming the paste into strips or sheets of uniform thickness, chilling the strips or sheets to make the same brittle, and then cracking the brittle material to form crystal-like fragments.

12. A process as in claim 11 in which the strips or sheets, prior to chilling, are scarfed to facilitate cracking to a desired size.

13. In a process for the manufacture of a fruit product, forming a homogeneous mass containing fruit solids and sugar, adding a fruit juice concentrate to the mass, forming the material into strips or sheets of uniform thickness and chilling the material to render it brittle, and then cracking the material to form crystal-like fragments.

14. In a process for the manufacture of a fruit product, forming a homogeneous mass containing fruit solids and sugar, adding a fruit juice concentrate to the mass, forming the material into strips or sheets of uniform thickness and chilling the material to render it brittle, cracking the material to form crystal-like fragments, and then drying the material without modifying the crystal-like form of the same to form a free flowing product.

15. In a process for the manufacture of a fruit product, removing moisture from fruit solids and adding sugar thereto to form a material of paste-like consistency, separately concentrating fruit juice by evaporation, adding the juice concentrate to the first named material to form a homogeneous material for further treatment, extruding the material into strips or sheets of uniform thickness and chilling it to form a hard brittle mass, cracking the chilled material to form crystal-like fragments, and then drying the fragments to form a free flowing product.

16. In a process for the treatment of a homogeneous material containing sugar and other food solids and moisture, the steps of forming a paste-like mass of the material into strips or sheets of uniform thickness, chilling the strips or sheets to a low temperature to make the mass brittle, and then cracking the brittle material to form crystal-like fragments.

17. A process as in claim 16 in which the cracked fragments are dried by contact with a drying atmosphere.

JOHN H. FORKNER.

References Cited in the file of this patent

UNITED STATES PATENTS

| Number | Name | Date |
| --- | --- | --- |
| 1,601,101 | Barclay | Sept. 28, 1926 |
| 2,209,889 | Lechman | July 30, 1940 |
| 2,290,120 | Thomas | July 14, 1942 |
| 2,407,801 | Steinwand | Sept. 17, 1946 |

FOREIGN PATENTS

| Number | Country | Date |
| --- | --- | --- |
| 21,018 | Australia | of 1935 |